United States Patent [19]
Merkelo et al.
[11] Patent Number: 4,866,660
[45] Date of Patent: Sep. 12, 1989

[54] OPTOELECTRAULIC DEVICES BASED ON INTERFERENCE INDUCED CARRIER MODULATION

[75] Inventors: Henri Merkelo; Bradley D. McCredie; Mark S. Veatch, all of Urbana, Ill.

[73] Assignee: AMP Incorporated, Harrisburg, Pa.

[21] Appl. No.: 162,166

[22] Filed: Feb. 29, 1988

[51] Int. Cl.[4] .......................... G06G 9/00; G02F 1/33

[52] U.S. Cl. .................................... 364/822; 364/819; 356/256; 350/358

[58] Field of Search ...................... 364/822, 819, 602; 350/358; 356/256

[56] References Cited

U.S. PATENT DOCUMENTS

| | | | |
|---|---|---|---|
| 4,030,840 | 6/1977 | Lawton et al. | 356/256 |
| 4,357,676 | 11/1982 | Brown | 364/822 |
| 4,359,260 | 11/1982 | Reinhart et al. | 350/96.12 |
| 4,558,925 | 12/1985 | Casseday et al. | 364/822 X |
| 4,563,696 | 1/1986 | Jay | 357/22 |
| 4,566,760 | 1/1986 | Abramovitz et al. | 364/822 X |

OTHER PUBLICATIONS

P. Debye, F. W. Sears, Proc. Nat. Acad. Sci. vol. 18, p. 409, 1932.
R. Lucas, P. Biquard, J. Phys. Rad., vol. 3, p. 464, 1932.
N. Bloembergen, et al. IEEE J. QE, vol. 3, p. 197, 1967.
W. Kaiser, M. Maier, "Stimulated Rayleigh, Brillouin and Raman Spectroscopy," Laser Handbook, vol. 2, ed. by F. T. Arechi, E. O. Schutz-Dubois, Amsterdam: North-Holland, 1972.
I. P. Batra, R. H. Enns, D. W. Pohl, Phys. Status Solidi (b), vol. 48, p. 11, 1971.
N. Bloembergen, "Nonlinear Optics", New York: Benjamin, 1977.
S. A. Akhmanov, N. I. Koroteev, "Nonlinear Optical Techniques in Spectroscopy of Light Scattering," Series Problems in Modern Physica, Moscow: Nauka, 1981 (Russian).
Y. R. Shen, "The Principles of Nonlinear Optics", New York: Wiley, 1984.
D. Ritter, E. Zeldov, and K. Weiser, Appl. Phys. Lett., vol. 49, No. 13; Sep. 29, 1986, 1986 American Institute of Physics, "Steady-State photocarrier grating technique for diffusion length measurement in photoconductive insulators", pp. 791–793.
D. Ritter and K. Weiser, "Optics Communications", Suppression of Interference Fringes in Absorption Measurements on Thin Films, vol. 57, no. 5, Apr. 1, 1986, pp. 336–338.
D. Ritter, K. Weiser, and E. Zeldov, J. Appl. Phys., (List continued on next page.)

Primary Examiner—Jerry Smith
Assistant Examiner—Charles B. Meyer

[57] ABSTRACT

A subpicosecond solid state optical correlator based on interference induced carrier modulation includes a photosensor circuit having a photoconductive element and a pair of opposed electrodes. A voltage difference is created across the electrodes to define an electrical field direction, and the element operates to generate charge carriers in response to optical energy incident on the photoconductive element. First and second optical signals are directed onto the photoconductive element to form an interference pattern thereon when the signals overlap in time and space. This interference pattern produces spatial modulation of the distribution of the carriers into lines or planes, at least some of which are not parallel to the electrical field direction. The resulting photocurrent is monitored to detect a parameter associated with the presence or absence of the interference pattern. The interference pattern defines a characteristic nodal spacing between adjacent ones of the lines, and the carriers include higher mobility carriers and lower mobility carriers. The ambipolar diffusion length is no greater than the characteristic nodal spacing, and an integrated value of the photocurrent is therefore less when the optical signals overlap in optical frequency and time and form the interference pattern than when the optical signals do not overlap in optical frequency and time.

55 Claims, 14 Drawing Sheets

OTHER PUBLICATIONS vol. 62, No. 11, Dec. 1, 1987, 1987 American Institute of Physics, Steady-State Photo-carrier Grating Technique for Diffusion-Length Measurement in Semiconductors: Theory and Experimental Results for Amorphous Silicon and Semi-Insulating GaAs, pp. 4563–4570.

B. Jensen, "Quantum theory of the complex dielectric constant of free carriers in polar semiconductors", IEEE J. Quantum Electron., vol. QE-18, pp. 1361-1370, Sep. 1982.

I. M. Dykman and P. M. Tomchuk, "Influence of coherent light beams on free carriers in semiconductors", Sov. Phys. Solid State vol. 26, No. 9, Sep. 1984, 1985 American Institute of Physics, pp. 1653-1655.

Cojocaru-E., Medianu-R., "Interference pattern in photoresist layer on reflecting substrates", Rev. Roum. Phys. (Rumania). vol. 31, no. 5, pp. 523-527, 4 refs. 1986 (abstract).

T. F. Carruthers and J. F. Weller, Naval Research Laboratory, "Picosecond Optical Autocorrelation Measurements on Single Optoelectronic Devices", pp. 483–486.

Alferov-Zh-1 et al., "Disordering of single-crystal gallium arsenide by picosecond light pulses", Sov. Tech. Phys. Lett. (USA) vol. 9, no. 8, pp. 387-388, 5 refs. Aug. 1983 (abstract).

| | | | | |
|---|---|---|---|---|
| $P_{L1}$ | 1 | 0 | 0 | 1 |
| $P_{L2}$ | 0 | 1 | 0 | 1 |
| $Q$ | $Q_1$ | $Q_1$ | 0 | $Q_2$ |
| $V_0$ | $V_H$ | $V_H$ | $V_L$ | $V_L$ |

OPTOELECTRAULIC DEVICES BASED ON INTERFERENCE INDUCED CARRIER MODULATION

BACKGROUND OF THE INVENTION

This invention relates to optical correlators based on charge carrier modulation by optical interference.

Historically, investigation of interaction of light with periodically modulated features in materials dates back to the investigation of ultrasound-induced light diffraction experiments. P. Debye, F. W. Sears, Proc. Nat. Acad. Sci. vol. 18, p. 409, 1932; R. Lucas, P. Biquard, J. Phys. Rad., vol. 3, p. 464, 1932.

Initially, experiments were aimed at investigating such characteristics of ultrasound as velocity of propagation, dispersion, attenuations, reflection, etc. The fortuitous closeness of high frequency acoustical wavelengths in dense materials to the wavelengths of light made these studies successful. Conversely, the understanding of these interactions produced many applications now used in laser engineering. As strong laser sources became available, light alone could produce periodic features in materials which could mimick the standing waves of ultrasound and, therefore, exhibit properties analogous to those observable in acoustooptic interactions. With substantial differences in the dynamic character of the interacting mechanisms, especially on picosecond and femtosecond time scales, the subject of interference-induced material property modulation received considerable attention and produced a significant number of results.

Numerous studies report on both the formation of light-induced spatial modulation in materials and the application of these effects to the study of material properties. In these cases, the effect of optical interference produces periodic changes in the optical parameters which can be attributed to index of refraction modulation, often describable by the third-order nonlinear susceptibility coefficient. N. Bloembergen, et al., IEEE J. QE, vol. 3, p. 197, 1967. W. Kaiser, M. Maier, "Stimulated Rayleigh, Brillouin and Raman spectroscopy," Laser Handbook, vol. 2, ed. by F. T. Arechi, E. O. Schulz-Dubois, Amsterdam: North-Holland, 1972. I. P. Batra, R. H. Enns, D. W. Pohl, Phys. Status Solidi (b), vol. 48, p. 11, 1971. N. Bloembergen, *Nonlinear Optics.* New York: Benjamin, 1977; S. A. Akhmanov, N. I. Koroteev, "Nonlinear optical techniques in spectroscopy of light scattering," *Series Problems in Modern Physics.* Moscow: Nauka, 1981 (in Russian); Y. R. Shen, *The Principles of Nonlinear Optics.* New York: Wiley, 1984. B. Jensen, "Quantum theory of the complex dielectric constant of free carriers in polar semiconductors," IEEE J. Quantum Electron., vol. QE-18, pp. 1361–1370, September 1982.

All of the above cited references study or apply the effects of interference induced diffraction of probe beams. In spite of this effort, there is a cotinually increasing need for optoelectronic devices that are capable of processing ultrashort optical signals and that are suitable for integrated circuit applications.

D. Ritter, et al. have published a paper which discusses the use of two interfering optical beams to measure the ambipolar diffusion length of a photoconductor. D. Ritter, et al.. Appl. Phys. Lett, Vol. 49, No. 13, pp. 791–793, Sept. 29, 1986. In this paper the two interfering beams are of differing intensities, with one much less intense than the other, and the two beams are directed onto the photoconductor to form an interference pattern. Because of the selected beam intensities, the spatial modulation of charge carriers in the photoconductor resulting from optical interference between the two beams is small. The photocurrent varies as a function of the presence or absence of optical interference between the two beams if the ambipolar diffusion length of the charge carriers is sufficiently small with respect to the nodal spacing of the interference pattern. By varying the nodal spacing, the photocurrent can be analyzed to determine the ambipolar diffusion length. The Ritter, et al. article discusses the use of this technique to measure the ambipolar diffusion length of hydrogenated amorphous silicon.

The problem addressed by Ritter, et al. is the measurement of a material parameter of a semiconductor. To this end Ritter, et al. require that the two interfering optical beams be widely different in intensity. Furthermore, the specific material used by Ritter, et al. (hydrogenated amorphous silicon) typically has an electron mobility less than 10 $cm^2$/volt-sec.

The present invention is directed to the fundamentally different problem of creating a correlator useful in measuring a selected parameter of one of the two interfering beams (such as amplitude distribution, frequency distribution, or pattern of amplitude modulation, for example). For this reason there are many differences between the structure and operation of the correlators of this invention and the experiments described by Ritter, et al. These differences will be brought out in the following sections.

SUMMARY OF THE INVENTION

According to this invention, a correlator is provided based on interference induced carrier modulation. This correlator comprises a sensor system having a sensor element (such as a photoconductor) which supplies charge carriers when excited by an energy beam (such as a light beam), and means for generating a sensor signal in response to the charge carriers. Means are provided for directing first and second beam signals (such as optical beams) at the sensor element to form an interference pattern thereon when the beam signals overlap in time and space on the sensor element. This interference pattern provides a spatial modulation in the distribution of the charge carriers, and means are provided for monitoring the sensor signal to detect a parameter of the sensor signal (such as integrated photocurrent) that varies as a function of the presence of the interference pattern.

One important feature of certain embodiments of this invention is that the interfering components of the beam signals (those components which overlap in time, beam frequency and space at the sensor element) may have intensities which are equal to one another within a factor of three. At least one of the beam signals is typically modulated or scanned in time, frequency or space, so that the interfering components only interfere for selected parts of the overall correlation process. Because the interfering components are substantially matched in intensity, sensor signal modulation resulting from the interference or lack of interference between the interfering components is maximized, thereby increasing the effective signal to noise ratio. This makes possible more accurate and reliable correlation of the beam signals.

Another important feature of certain embodiments is that the two beam signals may have differing beam frequency distributions. This allows detection of parameters characteristic of those components of the two beam signals that overlap in beam frequency, or alternately of those components that do not overlap in beam frequency. Such embodiments have application as optical demultiplexers, for example, as explained below.

Certain embodiments include means for delaying one of the beam signals with respect to the other to allow the phase of the beam signals to be adjusted relative to one another. This allows one beam signal to be scanned in time across the other beam signal, as explained below.

In the embodiments described below, the resulting spatial modulation in the carrier distribution reduces the sensor signal such that an integrated value of the sensor signal is less when the first and second signals overlap in time to form the interference pattern than when the first and second signals do not overlap in time or when only one signal is present. The formation of carrier modulation gives an appearance of nonlinear photoconductivity, and in the limit of negative differential photoconductivity.

The interference pattern, when present, increases the resistance seen by the carriers, and reduces the photocurrent associated with the carriers. This effect can be used in many applications, including semiconductor optical correlation and autocorrelation devices, light-by-light sampling devices, and light-by-light electronic switches. Since these devices are intended to deliver photocurrent, high carrier mobility is desirable. Preferably, the mobility of the high mobility carrier is greater than 10cm$^2$/volt-sec. But, because these devices are intended to operate by maximizing current extinction with the aid of optical interference, maximum contrast between the so-called on-state and the off-state is attained when only one carrier mobility is high and when ambipolar transport is low or negligible. A low mobility of one carrier and, in the limit, total immobility of this carrier is desirable for maximizing efficiency.

This invention has applications in both time domain correlation and frequency domain correlation, as described below. Unless otherwise indicated by the context, the terms "correlation" and "correlator" are intended to encompass both types of correlation.

The embodiments discussed below provide important advantages. They are solid state systems which rely on a single semiconductor for both optical detection and correlation. These systems are extremely inexpensive in simple form and can readily be fabricated as compact, integrated circuit devices. No nonlinear optical crystals are required. Because these are current integrating devices that take advantage of the instantaneity of optical field superposition, a finite recombination lifetime does not limit the temporal resolution of the correlation or sampling process, making these devices suitable for optical picosecond and femtosecond pulse applications. For light by light current switching applications, high speed response can be enhanced by selecting carrier lifetimes appropriately. For high speed applications, the devices can be designed readily into suitable transmission line configurations, such as microstrips, striplines, coplanar lines and coplanar waveguides.

The invention itself, together with further objects and attendant advantages, will best be understood by reference to the following detailed description.

BRIEF DESCRIPTION OF THE DRAWINGS

FIG. 2 is a schematic diagram showing the angular orientation between the electric field $\bar{\epsilon}$ resulting from an applied voltage across the gap spacing L and the interference vector $\bar{k}_A$ which is assumed to remain parallel to the Y coordinate in the embodiment of FIG. 1a.

FIGS. 19a–19f are waveforms illustrating the operation of the embodiment of FIG. 18.

DETAILED DESCRIPTION OF THE PRESENTLY PREFERRED EMBODIMENTS

The following section will first discuss general principles of operation in conjunction with FIGS. 1a–4, and will then describe five preferred embodiments of the present invention in conjunction with FIGS. 5–19f.

GENERAL DISCUSSION

Figure 1A:
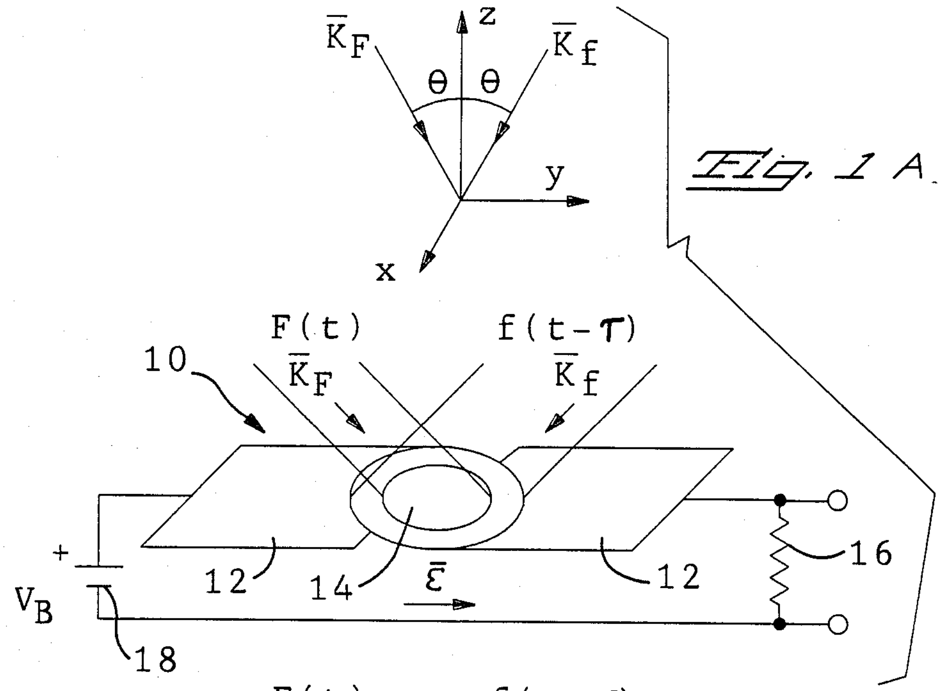
FIG. 1a is a schematic diagram of an optical correlator which incorporates a first preferred embodiment of this invention.

For illustration purposes, the interference induced carrier modulation effect of this invention will be elaborated using the example of picosecond optical signal autocorrelation. This example utilizes a biased photoconductor 10 which includes two electrodes 12 and a photoconducting element 14 (FIG. 1a). The photoconductor 10 is connected in series with a load resistor 16, and a DC power supply 18 supplies a biasing voltage VB The photoconductor 10 responds to optical energy incident on the photoconducting element 14 by forming charge carriers which pass a photocurrent between the electrodes 12. The magnitude of this photocurrent is measured by measuring the voltage drop across the resistor 18.

In this example, an optical signal F(t) of duration $\Delta t$ is incident on the biased photoconductor 10 as shown schematically in FIG. 1*a;* F(t) produces a transient photocurrent $J_F(t)$ of duration $\Delta T \geqq \Delta t$, per unit width of electrode 12. Similarly, a delayed portion of the same signal, designated $f(t-\tau)$, produces a photocurrent $J_f(t-\tau)$, also of duration $\Delta T$, when incident on the same photoconductor 10 in the absence of $J_F(t)$ That is, when the delay $\tau$ between the two signals is large, such that $\tau > \Delta T$, the biasing circuit collects a charge (per unit width of electrode)

$$Q = \int_{-\infty}^{\infty} [J_F(t) + J_f(t-\tau)]dt = Q_F + Q_f \tag{1}$$

equal to that of an ordinary photoconductor. The restriction on the separation of signals can be further reduced from $\tau > \Delta T$ to $\tau > \Delta t$ under the assumption that carrier generation is linear and that transport is linear. Therefore, such effects as carrier induced band shift, carrier-carrier scattering, or even density dependent recombination rates that might exist at high levels of illumination are neglected in these discussions since the principal focus of this example is the processing of low level signals. When the optical signals overlap in space on the photoconductor 10 and begin to overlap in time such that $\tau \leqq \Delta t$, interference defines the spatial energy distribution and defines the carrier excitation pattern on the photoconductor 10. It is then the dynamics of inhomogeneously distributed carriers that determines the conductive process.

Figure 1B:
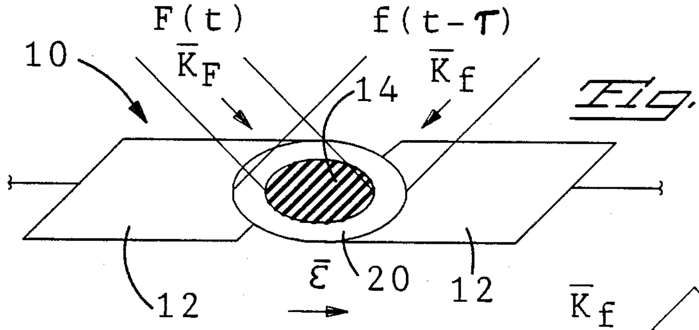
FIG. 1b is a schematic diagram of the embodiment of formation of nodes and nulls produced by optical interference.
Figure 1D:
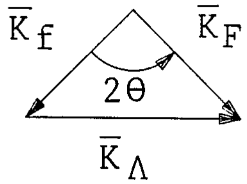
FIG. 1d is a vector diagram showing the relationship between the propagation vectors of FIG. 1b.

Choosing the directions of the propagation vectors $\bar{k}_F$ and $\bar{k}_f$ of the respective signals F(t) and f(t) to form the yz-plane (which is assumed to include the plane of incidence) as shown in FIGS. 1*a* and 1*d*, the interference grating vector on the surface of the photoconductor is $$\bar{k}_\Lambda = \bar{k}_F - \bar{k}_f = 2k_y\bar{a}_{w_y}. \tag{2}$$

Figure 1C:
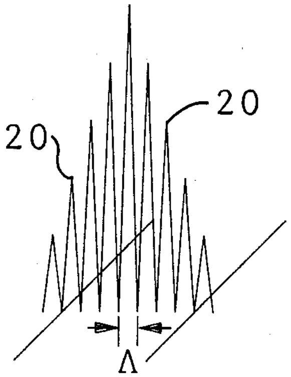
FIG. 1c is a schematic diagram of the amplitude of carrier density in the distribution shown in FIG. 1b.
Figure 2:
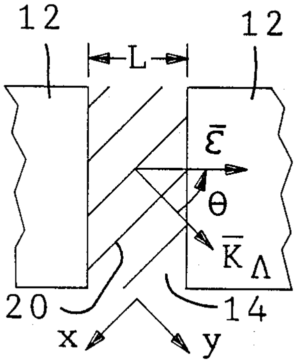

Since $k_y = |\bar{k}_F| \sin\theta = |\bar{k}_f| \sin\theta$, the spatial period of the interference is $$\Lambda = \frac{2\pi}{k_\Lambda} = \frac{\lambda}{2\sin\theta} \tag{3}$$

ps where $k_\Lambda$ A is the magnitude of $\bar{k}_\Lambda \lambda$ is the wavelength of light, $2\theta$ is the angle between $\bar{k}_f$ as in FIG. 1*d*. Therefore, in the classical interference case of two plane waves whose polarization vectors are both perpendicular to the plane of incidence and parallel to the surface on which they are incident, the energy is deposited in line-shaped nodes separated by $\Lambda$ (FIG. 1*c*). As in semiconductor diffraction experiments, line-shaped carrier concentration nodes 20, separated by $\Lambda$, are established on the surface of the semiconductor as illustrated in FIG. 1*b;* within the nodes 20, the density falls off exponentially along the z-coordinate and the carriers are in effect distributed along the z-coordinate in planes which contain the nodes 20. In the general case, which is illustrated in FIG. 2, the grating vector $\bar{k}_\Lambda$ forms an angle $\phi$ with respect to the applied electric field $\bar{\epsilon}$.

Assuming at first that the carriers can retain the nodal distribution within their recombination lifetime and that, as before, transport, generation, and recombination are not density dependent, a simple conduction model can be made on the basis of overall optical energy conservation. The special case of $\phi = 90°$ is particularly useful for discussion purposes. For $\phi = 90°$, there are $N = \Lambda^{-1}$ nodes 20 per unit electrode width. If each node 20 is of resistance per unit length $\rho(t)\Omega cm^{-1}$, the resistance of each node 20 is $\rho(t)L$ and the current per unit width of electrode is $$J(t) = \frac{NV}{\rho(t)L} = \frac{V}{\Lambda\rho(t)L} \tag{4}$$

where V is the voltage applied to create $\epsilon$ and L is the distance between the electrodes 12. Since the number of carriers created in the detector averaged over an area of several nodes 20 is the same regardless whether interference takes place or not, and since all the carriers participate in transport under the influence of the same voltage, then the integral of Eqn. (4)

$$\int_{-\infty}^{\infty} J(t)\, dt = Q \tag{5}$$

should be equal to the integral of Eqn. (1), such that $Q = Q_F + Q_f$, regardless whether the interference is complete or partial. When $\phi$ is allowed to vary, however, the electrodes 12 are connected by conductive nodes 20 of length $L/\sin\phi$, still of the same resistance $\rho(t)\ \Omega cm^{-1}$ since the number of incident photons averaged over several nodes 20 remains the same. The current per unit electrode width is now $$J = \frac{V}{\Lambda\rho(t)L} |\sin\phi|, \tag{6}$$

which ideally vanishes for $\phi = O$ when the correlating signals are of equal strength and when interference is complete. In this configuration, the amount of charge that the circuit collects is not only a measure of the photon flux incident on the photodetector, but is also a measure of $\tau/\Delta/t$. Using the previously determined limiting values of the integral of Eqn. (5):

$$Q\left(\frac{\tau}{\Delta t}\right) = \begin{cases} Q \text{ for } \frac{\tau}{\Delta t} > 1 \\ 0 \text{ for } \frac{\tau}{\Delta t} = 0 \end{cases} \tag{7}$$

Experiments with picosecond optical signals have confirmed that the effect of interference induced carrier modulation manifests itself strongly and in accordance with the broad features of this general discussion. In practice, however, the current may not vanish entirely for a number of reasons such as lack of total optical coherence, amplification of dark current, loss of nodal integrity, etc. Then, instead of Eqn. (5) vanishing for $\tau = 0$, $\phi = 0$, the current integrates to give a certain minimum leakage charge $Q_{min}$ which defines an interference extinction ratio EX as follows:

$$EX = \frac{Q - Q_{min}}{Q}. \quad (8)$$

Since optimization of the devices discussed above is achieved when individual currents $J_F$ and $J_f$ are high and when currents produced during maximum interference are low or zero, it is generally important that the time constant $\tau_D$ for diffusion be long in comparison to recombination time. Since $$\tau_D = \frac{1}{D_a k_\Lambda^2}, \quad (9)$$

where $D_a$ is ambipolar diffusion, its value has a substantial range. For common values of $D_a$, this diffusion time constant can vary from a fraction of a picosecond to hundreds of picoseconds, and can be made nearly arbitrarily large by adjusting $k_\Lambda$. With specially engineered materials in which the geminate diffusion coefficient is low or zero but at least one individual carrier type diffusion (and, therefore, mobility) is high, the condition for $\tau_D >> \tau$ which is desirable for maximizing the extinction coefficient EX, can be met without the drawback of having to make large devices and without substantial sacrifice in current.

The optimum semiconductor parameters for enhancing the operation of carrier modulated devices are not unique since optimization involves maximizing not only the extinction ratio EX but the quantum efficiency in generating and collecting a maximum charge Q in the non-interfering mode. The extent to which the modulated carrier profile distorts and, consequently, the amount of current that flows through the device, is directly dependent on the values of material parameters. In high mobility and long lifetime materials, the modulated carrier profiles relax to a homogeneous profile before vanishing. This relaxation is rapid when both carriers have high mobility. For high mobility, long carrier lifetime materials, conduction currents tend to grow after the initial adjustment to the formation of modulated carriers. This leads to the formation of significant conducting channels through the device which are caused by carrier penetration into the nodes of the distribution. Again, this current leakage contributes to $Q_{min}$ and, therefore, reduces EX. In low mobility and short lifetime materials, the carriers recombine before substantial spatial distribution takes place.

Figure 3:
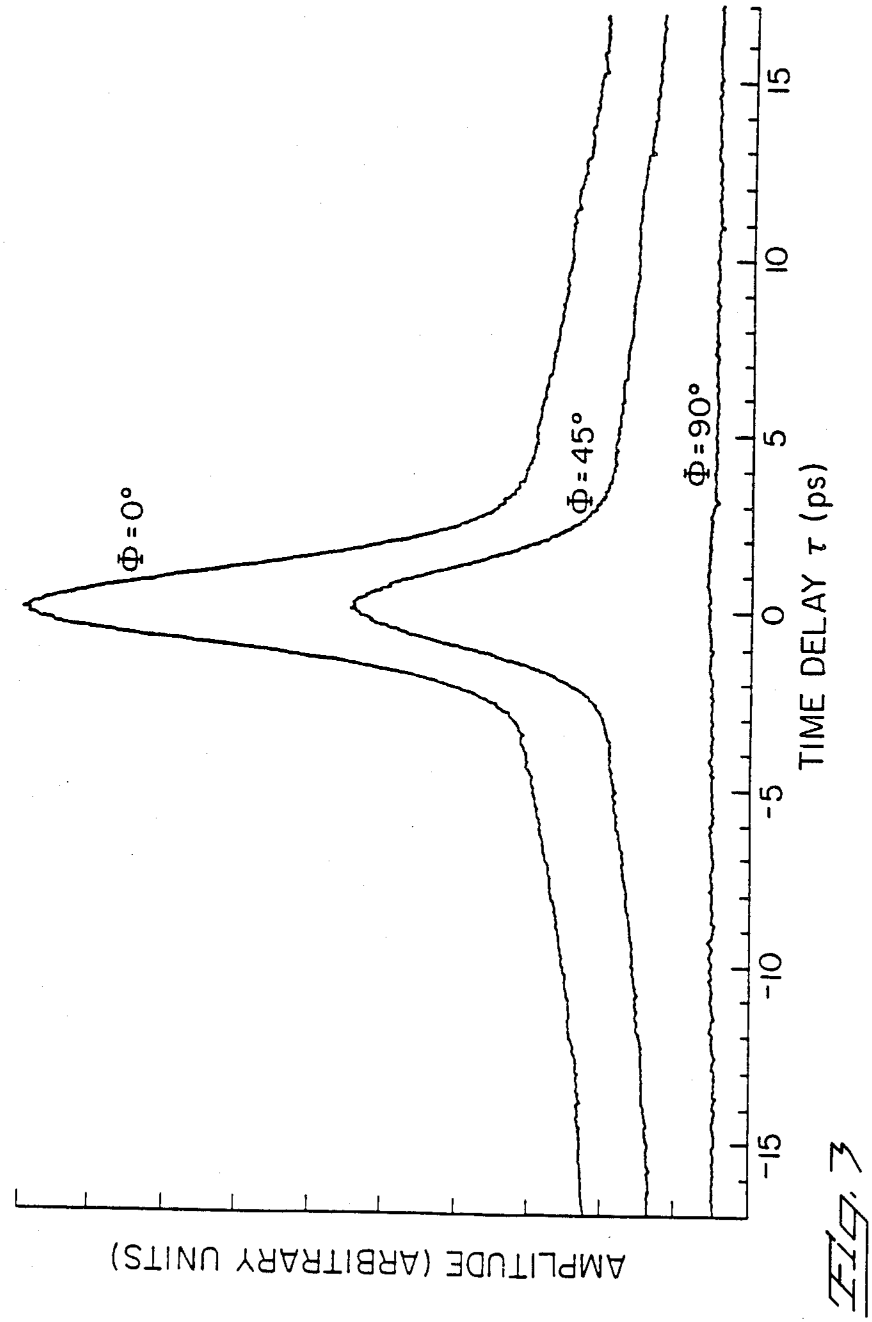
FIG. 3 is a plot of autocorrelation signals obtained with balanced beams, interfering in a geometry as illustrated in FIG. 1a and FIG. 2.

The practical feasibility of interference induced carrier modulation devices has been experimentally shown. Autocorrelation of synchronously modelocked dye laser pulses, emitted in the 600 nm range at a repetition rate of $80 \times 10^6$ pps and at an average power of a few milliwatts, has been carried out with devices fabricated from a number of materials, both amorphous and crystalline, in homogeneous as well as quantum well configurations. These experiments have shown, for example, as illustrated in FIG. 3, that strong extinction is achievable in nitrogen implanted silicon on sapphire, treated with an approximate $2.2 \times 10^{14}$ cm$^{-2}$ dose, at 140 keV. An illustration of the anisotropic feature of the controlling mechanism is also illustrated by showing the dependence of the autocorrelation signal described by Eqn.(6). Variation of $\phi$ and of values $\bar{\epsilon}_F.\bar{\epsilon}_f$ values is used to distinguish carrier modulation operation from other nonlinear effects; optical intensities were always kept in a range in which the carrier modulation mechanism was entirely dominant.

Figure 4:
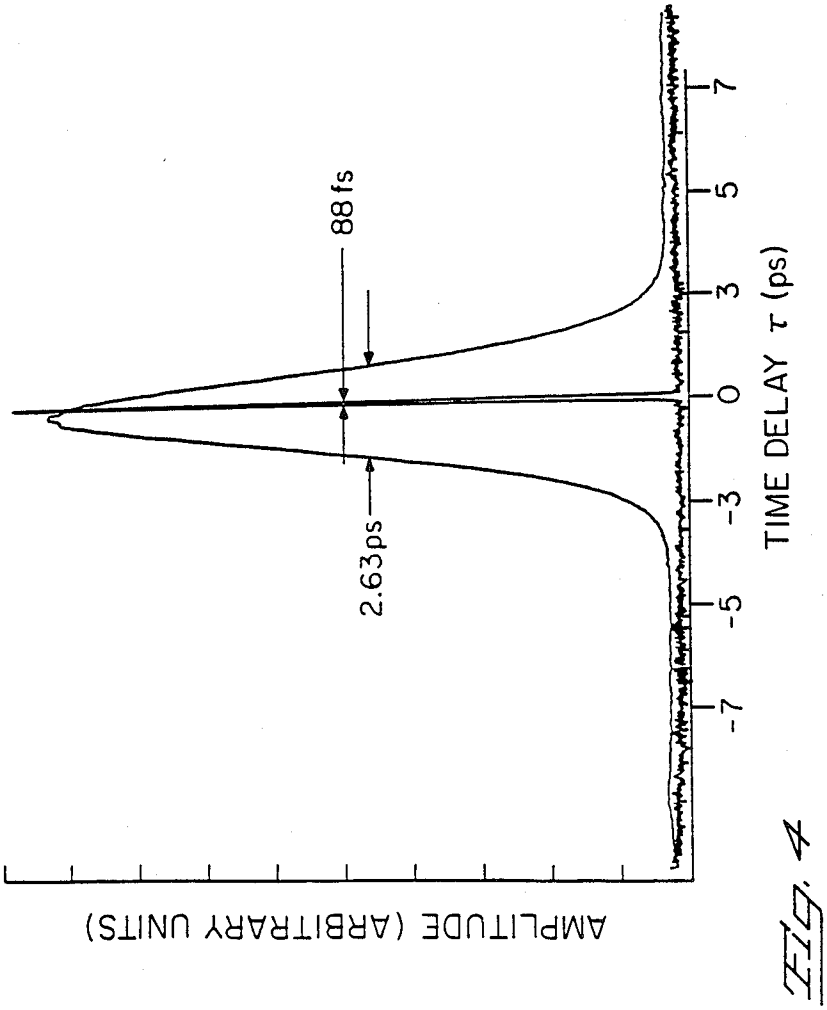
FIG. 4 is a diagram illustrating response of carrier modulation to long and short duration optical interference.

The experimental conditions remained exactly the same for the illustration shown in FIG. 4, in which the response of carrier modulation to relatively long (2.63 ps, FWH) and to short (88 fs, FWHM) durations of optical interference is demonstrated. The autocorrelation signals show good stability and excellent signal to noise ratio when the parameters are in one of the favorable ranges for high quantum efficiency (high Q) and high extinction ratio EX (high autocorrelation contrast).

Taking the ratio of electron mobility to hole mobility in any given material as a possible figure of merit, silicon and GaAs are comparably classified as suitable materials for carrier modulation devices. However, with the superior electron mobility in GaAs, its potential for good performance is clearly high, if the ambipolar diffusion length can be made sufficiently short as described above. Numerous other possibilities suggest themselves for achieving an actual total immobilization of one of the carriers, which could be simply impurity ions or carriers immobilized in quantum wells.

Characteristic nodal spacing $\Lambda$ in this specification refers to the distance given by Eqn. (3) and represents the distance between either the crests of the carrier density modulation or the distance between the nulls of the carrier density modulation. This distance is controllable by the angle $\theta$ and must be set at most equal to twice the electrode spacing L or smaller. When a correlation device is made to have L=10 microns, A can be as large as 20 microns, but is typically only 2 microns. In the event that a given interference pattern has variable nodal spacings, the characteristic nodal spacing is the smallest significant nodal spacing.

Ambipolar diffusion length in this specification refers to the statistical distance that an electron-hole-pair (EHP) will travel on the average before being destroyed by recombination or trapping. The motion of the EHP is the diffusive motion that develops as a result of the interference induced carrier modulation and, therefore, as a result of the interference induced carrier density gradients. For correlation devices, this length should be as short as possible and should not greatly exceed the characteristic nodal spacing defined earlier. For example, for a nodal spacing equal to 2 microns, the ambipolar diffusion length could be also 2 microns, but the device would be more efficient if the ambipolar diffusion length were only 1 micron or smaller.

In attaching electrodes to the devices, it is generally important to obtain not only ohmic contacts but also low resistance ohmic contacts for optimizing high speed operation. Such resistances, as would be expected, substantially dampen and broaden the current transients that result from the field modulation even for small values of resistance. At half an ohm of combined contact and lead resistance, the high speed current transient in picosecond applications is dampened by as much as 50 percent. The effects of these resistances extend beyond the initial current transient and, therefore, directly affect the amount of charge delivered by the devices and, as before, directly affect EX.

From this discussion it should be clear that the transient photoconductive response in semiconductors can be substantially altered by inducing carrier nodes with the aid of optical interference. The photocurrent produced by one optical signal can be increased or decreased by the addition of another optical signal.

Whereas the increase in photocurrent is a linear effect at low illumination, the decrease in photocurrent can be used in lieu of a nonlinear photoconductivity. This property manifests itself with orders of magnitude greater effectiveness in suitably tailored semiconductors than any transport nonlinearity known to the inventor, such as, for example, carrier-carrier scattering. The inhibiting trait of interference induced carrier modulation allows optical signals to be time-tagged for light-by-light sampling and correlation applications such as those demonstrated with picosecond laser pulses. This trait can also be utilized in frequency domain correlators.

Further details relating to the theory underlying the carrier modulation devices described above can be found in the February, 1978 issue of the IEEE *Journal of Quantum Electronics,* vol. 24, No. 2 H. Merkelo, et al.), "Semiconductor Optoelectronic Devices Based on Interference Induced Carrier Modulation". This paper and the corresponding parts of the specification are copyright IEEE, 1988. A prepublication draft of this paper (which is hereby incorporated by reference into this application) is contained in the application file.

The next section provides five concrete examples of preferred embodiments of this invention.

II. SPECIFIC EXAMPLES

A. Autocorrelator

Figure 5:
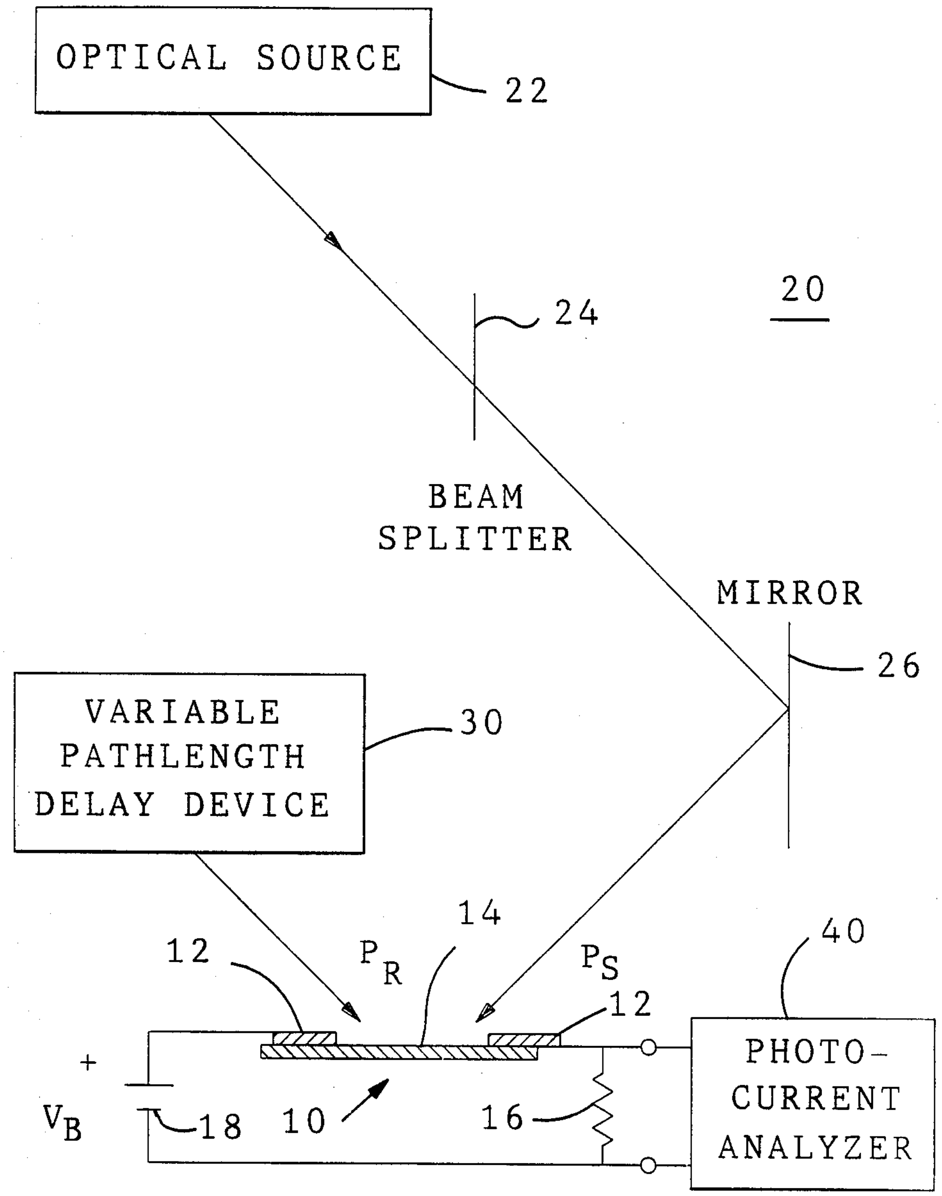
FIG. 5 is a schematic diagram of an autocorrelator which embodies the present invention.

FIGS. 5–**7*b* relate to an autocorrelator 20 that embodies the present invention. The autocorrelator 20 includes an optical source 22 which directs a series of optical pulses at a beam splitter 24. The source 22 can, for example, include a laser such as the modelocked dye laser described above or a semiconductor laser. Each of the optical pulses is split by the beam splitter 24 into a first part, which is directed via a mirror 26 onto the correlator, and a second part, which is directed to a variable pathlength delay device 30. The mirror 26 directs the reflected pulses $P_S$ onto the photoconductive element 14 of the photoconductor 10 described above and shown in FIG. 1*a***.

The pulses introduced into the delay device 30 are delayed by a continuously adjustable delay time before they are also directed as pulses $P_R$ onto the photoconductive element 14. For example, the delay device may include movable mirrors (not shown) which modify the path length of the pulses in accordance with mirror position, and thereby adjust the arrival time of the pulses $P_R$.

Figure 6:
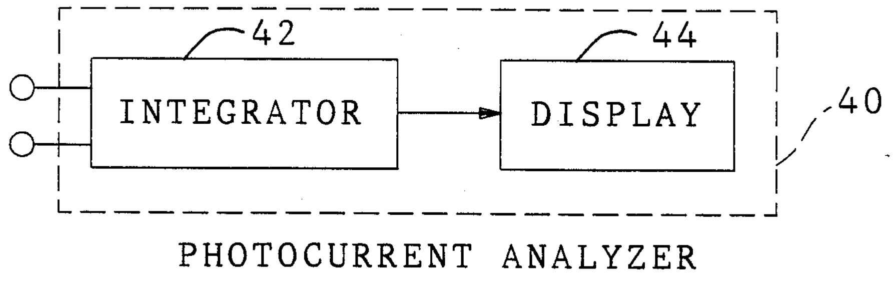
FIG. 6 is a block diagram of the photocurrent analyzer of FIG. 5.
Figure 7A:
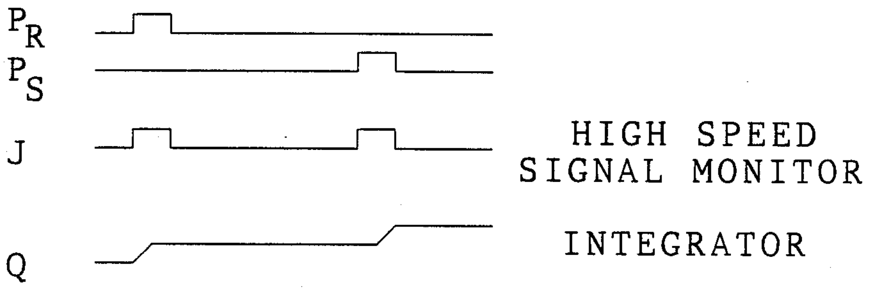
FIGS. 7a and 7b are waveforms illustrating the operation of the autocorrelator of FIG. 5.
Figure 7B:
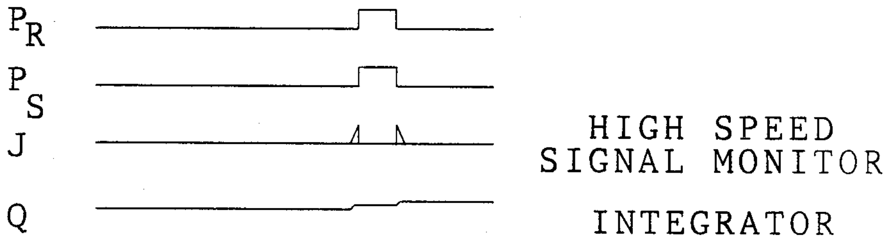

The voltage drop across the resistor 16 is applied as an input to a photocurrent analyzer 40 (FIG. 6). The analyzer 40 includes an integrator 42 and a display 44. The integrator 44 integrates the analyzer input for each pulse cycle to measure Q, the total electrical charge of the photocurrent for each pulse cycle, for display. The preceding general discussion provides a detailed analysis of the manner in which the pulses $P_S$, $P_R$ interact with the photoconductor 10. $P_R$ and $P_S$ correspond to F(t) and $f(t-\tau)$ as defined above in the general discussion.

FIG. **7*a* shows the operation of the autocorrelator 20 when the pulses $P_R$ do not overlap in time with the pulses $P_S$ In this case there is no optical interference, and the photocurrent J is made up of two conventional pulses which are integrated to a relatively high value of Q. However, when the delay device 30 is adjusted to cause the pulses $P_R$ and $P_S$ to be incident on the photoconductive element 14 at substantially the same time, optical interference between the pulses $P_R$, $P_S$ creates nodes in the carrier distribution as shown in FIG. 1*b*, and these nodes block the flow of substantially all photocurrent when the pulses $P_R$ and $P_S$ are identical in amplitude. The integrated photocurrent Q in this case is much lower than that of FIG. 7*a*. In an alternate embodiment (not shown) the photocurrent signals J of FIGS. 7*a* and 7*b*** can be displayed on a high speed signal monitor rather than integrated. Preferably the pulses $P_R$, $P_S$ are equal in intensity to within a factor of three. Most preferably the pulses $P_R$, $P_S$ are substantially equal in intensity. In this way the contrast between the photocurrent in the overlapping and the non-overlapping modes of operation is maximized.

Several preparations and processing techniques have been tested and found to produce satisfactory devices for correlation applications. All materials tested have been undoped. Crystalline and amorphous materials are discussed.

Materials have been prepared in an amorphous state by standard chemical vapor deposition techniques and sputtering techniques. These materials were of α-Si type, frequently hydrogenated. As is well known, such materials tend to degrade with exposure to light* and, in spite of acceptable performance as correlation devices, they do not constitute the preferred materials for device fabrication. However, for inexpensive preparations and low usage applications, amorphous thin films may be a preferred alternative.

* K. A. Epstein, N. T. Trran., F. R. Jeffrey, and A. R. Moore, Appl. Phys. Lett., 49, 173 (1987).

Superior photoconductors have been built from crystalline materials. The presently preferred technique employs the following steps.

The preferred starting material is a substrate of undoped crystalline silicon grown on sapphire as supplied for example by Union Carbide Corp. (Seekonk, Mass. 02771). For high speed devices, the thickness of the sapphire substrate is important in the usual sense of transmission line design, especially in the microstrip or stripline configuration.* For other designs, the thickness of sapphire can be varied, even for high speed applications when coplanar design** is used Devices with sapphire thickness of 400 μm and silicon thickness of 0.6 μm have been used to make good correlation devices. When microstrip design was used for high speed signal processing with less than ten picosecond resolution, sapphire samples of 125 to 165 μm thickness were used with a silicon film of 0.6 μm thickness.

* T. C. Edwards, *Foundations for Microstrip Circuit Design, John Wiley & Sons, Chichester,* 1981.

** C. P. Wen, "Coplanar Waveguide: A Surface Strip Transmission Line Suitable for Non Reciprocal Gyro Magnetic Device Applications" IEEE Transactions on Microwave Theory and Techniques, Dec. 1969, pp. 1087–1090.

For these applications, the 2" diameter wafers supplied by Union Carbide are diced into convenient sizes (10×10 mm squares) for processing. The processing steps used to form electrical contacts are standard for silicon, with additional emphasis on obtaining good ohmic contacts:

1. Evaporate an aluminum film of approximate thickness 2500 Angstroms.

2. Spin-on a photoresist (Shipley Co. AZ 1350J) for 30 seconds at about 3000 RPM.

3. Bake at 100° C. for approximately 12 minutes.

4. Project a positive mask of the desired electrode geometry with a mask aligner such as that made by Kasper. The mask used in this example had an electrode gap $L=20\ \mu m$. The electrode width was approximately the same as the sapphire thickness.

5. Develop the exposed film and follow it with a 10 minute bake at 125° C.

6. Etch away the aluminum with a suitable aluminum etch such as the following: one part H one part $HNO_3$, and one part deionized water.

7. Clean the sample.

8. Implant approximately $5\times Si^+$ ions per $cm^2$ at about 250kV using an ion implanter such as that made by DANYFSIK If 250kV is unavailable, $Si^{++}$ can be implanted at half the above voltage.

When thus prepared, the finished device is mounted into a fixture suitable for contacting the thin film electrode with some more substantial electrodes to which biasing and signal leads can be attached. When the device is operated in a microstrip transmission line configuration, standard commercial coaxial to microstrip transitions are used, as can be obtained, for example, from Pasternack Enterprises, P.O. Box 16759, Irvine, CA 92713.

This specific example of material and device fabrication is not meant to be limiting. In general, crystalline materials such as silicon-on-sapphire are presently preferred. However, other crystalline materials such as silicon without sapphire, germanium, gallium-arsenide, cadmium-telluride, cadmium selenide, cadmium-sulfide and others which are suitably modified to be efficient correlators can be used. It is desirable to diminish the ambipolar diffusion coefficient such that the ambipolar diffusion time $\tau_D$ remains large in comparison to the carrier lifetime $\tau_C$, keeping the mobility of one of the carrier species (generally the mobility of electrons) as high as possible. It is generally known that for a material to be a good photoconductor, the product of mobility $\mu$ and carrier lifetime $\tau_C$ should be as large as possible. For a good correlation device the material should preferably be processed to ensure that the carrier lifetime $\tau_C<\tau_D$ or $\tau_C<<\tau_D$ and still keep $\mu\tau_C$ as large as possible. In other words, $\mu\tau_C$ is preferably large by virtue of a large $\mu$ more than by virtue of a large $\tau_C$ (which could make $\tau_C>\tau_D$ or $\tau_C\sim\tau_D$).

Alternative methods to meet these conditions include the following:

A. To introduce defects into the material as in the case of silicon-on-sapphire described above.

B. To introduce deep donor impurities which would be ionized only by the interfering beams. These impurities could be introduced in the growth process, or by in-diffusion, or by implantation followed by annealing into a semiconductor whose bandgap is larger than the photon energy. In this case the ionized positive ions would be totally immobile, giving an ambipolar diffusion coefficient of zero or near zero.

C. To create inhomogeneties in the crystal structure such as to inhibit the motion of holes more than the motion of electrons in transient operation. In this case, the device is made such that photoelectrons flow in a direction perpendicular to alternating layers of gallium-arsenide and gallium-aluminum-arsenide, which form a so-called quantum well structure. Initially, when electron-hole pairs are just created, electrons are high in energy, and therefore move freely across the quantum well barriers, while holes are relatively immobile. After the initial transient, the quantum wells inhibit all diffusion and motion.

The following details of construction have been used to implement the autocorrelator 20. Of course, these details are provided only by way of illustration.

The resistor 16 can be a standard 100 kilo ohm carbon resistor. The power supply 18 can be any good stability, low ripple supply or battery that supplies a voltage in the range of 0–100 volts at a current of up to 10 mA. A Sorensen Model 5002-10 has been found to be suitable, and a voltage of 10–40 volts is suitable for the photoconductor 10 described above and the optical source described below. The current analyzer 40 can be any suitable analyzer for 1μAS–10 mA currents or corresponding voltages for the resistor 16 described above. A Hewlett Packard-Moseley Model 7035-B X-Y recorder has been found suitable, with the Y axis driven with a sawtooth voltage. Other analyzers, such as those employing lock-in amplifiers, can of course be used.

The optical source 22 can be a Spectra Physics 375-B dye laser synchronously pumped with a Spectra Physics Series 3000 frequency doubled Nd:YAG laser, having an average beam output power of 10 mW.

Any suitable conventional devices can be used for the beam splitter 24 and the mirror 26, including devices fabricated of reflecting aluminum layers on glass.

A suitable delay device 30 can be fabricated by mounting a retroreflector on a micrometer microscope stage driven with a low RPM synchronous motor. A suitable stage can be obtained from Klinger Scientific.

If the photocurrent signals are displayed on a high speed signal monitor such as an oscilloscope, it is preferable to use a high quality 50 ohm resistor or an instrument input resistor such as the Tektronix S-6 sampling head In this case the photoconductor 10 should preferably be constructed as a microstrip with transmission lines designed for compatability with a 50 ohm load resistor.

The autocorrelator 20 can be used to monitor very short optical signals, and is also suitable for coherent optical communication applications.

B. Sampling device

FIGS. **8–10*b* relate to a sampling device 50 which incorporates another embodiment of this invention. The sampling device 50 includes a photoconductor 10, resistor 16 and DC power supply 18 identical to those described. In this case, however, two separate optical sources 52, 54 are provided. In this example both sources 52, 54 generate pulses of coherent light centered at the same wavelength. The pulses generated by the source 52 are short duration probe pulses $P_P$ are delayed in a variable path length delay device 30 and then directed to the photoconductor 10. The pulses generated by the source 54 are longer duration sample pulses $P_S$ which are directed to the photoconductor 10**. Both pulses $P_P$ and $P_S$ are generated at regular intervals, and at generation the probe pulse $P_P$ precedes (or lags behind) the sample pulse $P_S$ in each pulse cycle.

Figure 9:
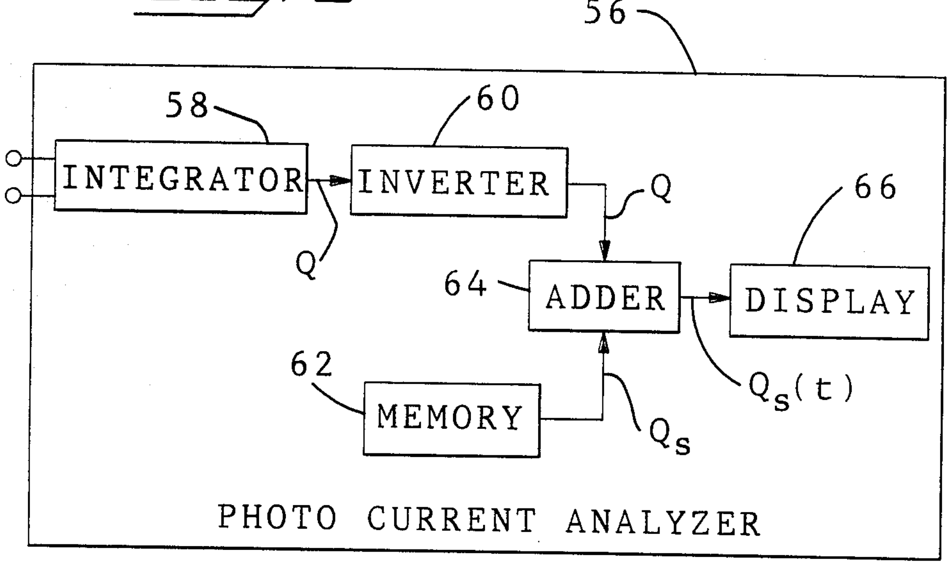
FIG. 9 is a block diagram of the photocurrent analyzer of FIG. 8.
Figure 10A:
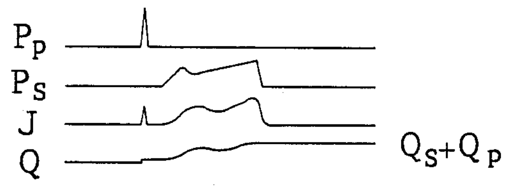
FIGS. 10a–10e are waveform diagrams illustrating the operation of the sampling device of FIG. 8.
Figure 10B:
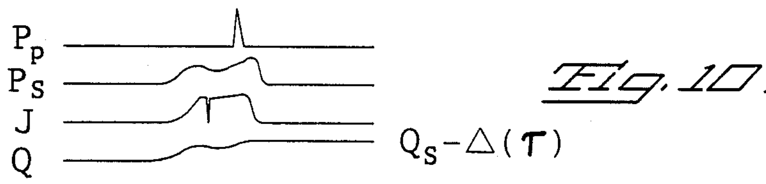

The photocurrent passing through the photoconductor 10 is analyzed in an analyzer 56 (FIG. 9). This analyzer 56 integrates the input signal (which is proportional to photocurrent) within each pulse cycle in an integrator 58, inverts the integrated value Q in an inverter 60, and applies the inverted value $-Q$ to an adder 64. The adder receives another input $Q_S$ from a memory 62, and the adder supplies the signal $Q_S(\tau)=Q_S-Q$ to a display 66, where $\tau$ is the delay between $P_P$ and $P_S$ The operation of the sampling device is illustrated in FIGS. **10*a* and 10*b*. As shown in FIG. 10*a***, when the pulses $P_P$, $P_S$ do not overlap in time, the integrated value Q is equal to $Q_P+Q_S$, where $Q_P$ is the integrated photocurrent associated with the probe pulse $P_P$ and $Q_S$ is the integrated photocurrent associated with the sample pulse $P_S$. However, when the pulses $P_P$, $P_S$ overlap in time, they interfere, creating carrier nodes as shown in FIG. 1*b*. This optical interference results in a sharp decrease in the photocurrent J during the time of overlap (FIG. 1*b*). This decrease in the photocurrent J reduces the integrated value Q by an amount proportional to the amplitude of the sample pulse $P_S$ at the time of overlap. The analyzer 56 subtracts Q from $Q_S$ to generate $Q_S(\tau)$ for display. $Q_S(\tau)$ is proportional to the amplitude of the sample pulse $P_S$ corresponding to $\tau$. The delay device 30 allows t to be adjusted and various parts of the sample pulse $P_S$ to be measured.

Figure 8:
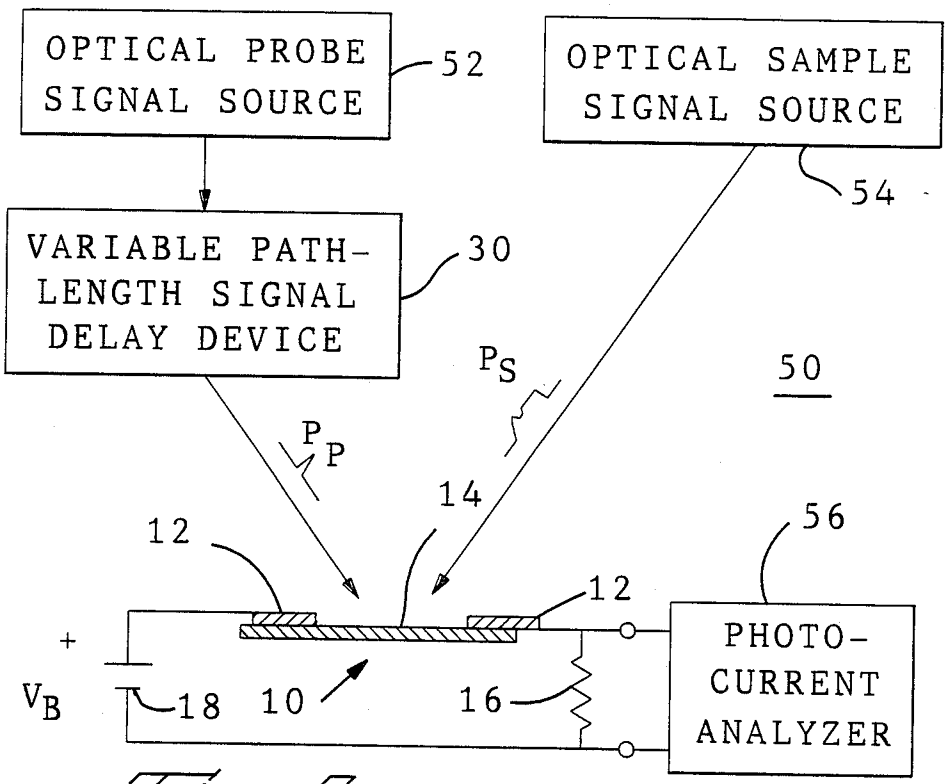
FIG. 8 is a block diagram of an optical sampling device which embodies the present invention.
Figure 10C:
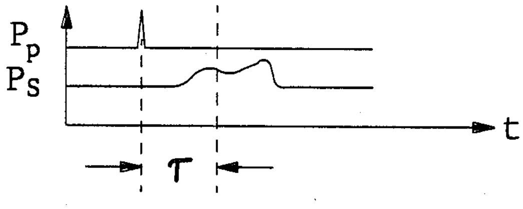
Figure 10D:
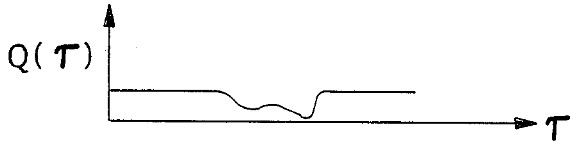
Figure 10E:

FIGS. 10*c*–10*e* illustrate the way in which the sampling device of FIG. 8 can be used to measure the shape and amplitude of the sample pulse $P_S$ The probe pulse $P_P$ is scanned across the sample pulse $P_S$ during consecutive cycles, by varying the delay time $\tau$ shown in FIG. 10*c*. The integrated photocurrent $Q(\tau)$ is then recorded for each value of $\tau$ to generate a waveform such as that shown at FIG. 10*d*. In FIG. 10*d* $Q(\tau)$ is equal to $Q_S+Q_P$ for values of $\tau$ at which there is no overlap between $Q_S$ and $Q_P$. For those values of $\tau$ at which $Q_S$ and $Q_P$ overlap, $Q(\tau)$ is less than $Q_S+Q_P$ by an amount $\Delta(\tau)$ proportional to the amplitude of $P_S$ at the corresponding time. The curve of FIG. 10*d* can be inverted and offset by $(Q_s+Q_p)$ to produce the curve of FIG. 10*e*, which is proportional to $P_S(t)$.

C. Switching Device

Figure 11:
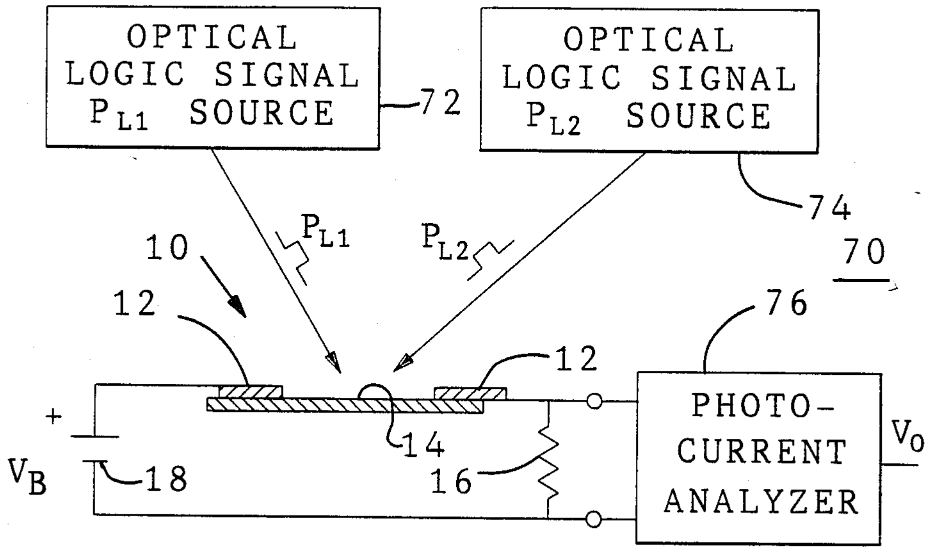
FIG. 11 is a block diagram of an optical switching device which embodies the present invention.
Figure 12:
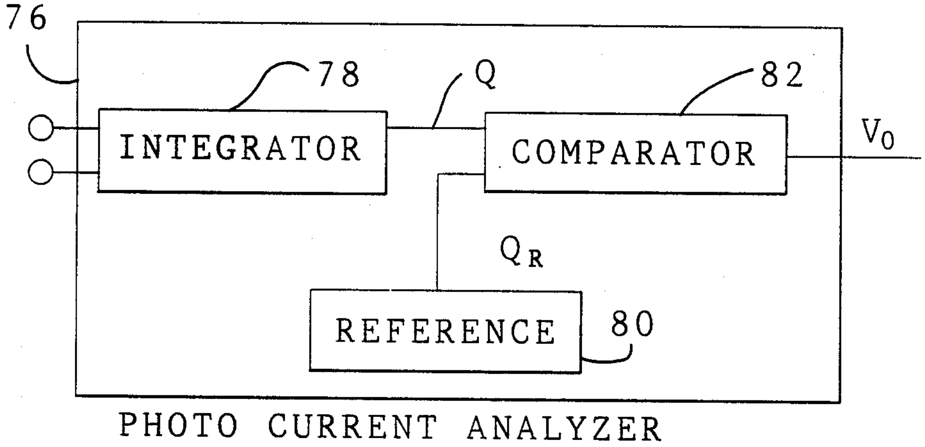
FIG. 12 is a block diagram of the photocurrent analyzer of FIG. 11.
Figures 13, 14:
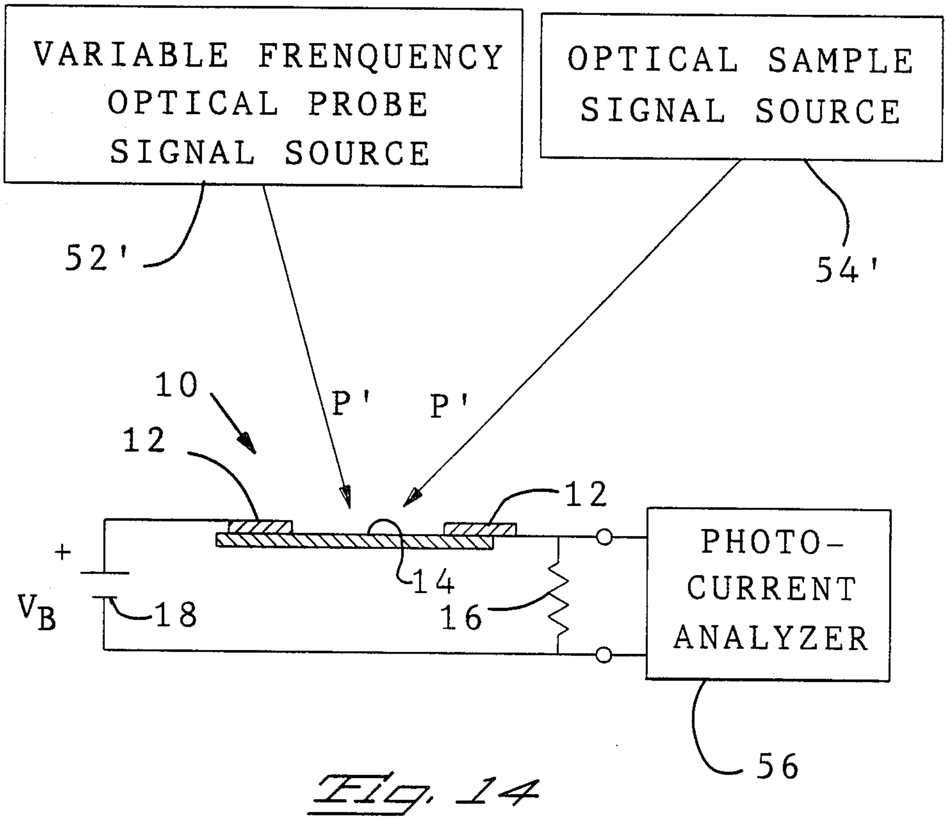
FIG. 13 is a table illustrating the operation of the switching device of FIG. 11.
FIG. 14 is a block diagram of an optical , spectral analyzer which embodies the present invention.

FIGS. 11–13 relate to a switching device 70 which produces an output signal $V_0$ which corresponds to a logical combination of two optical logic signals $P_{L1}$ and $P_{L2}$. As shown in FIG. 11, the logic signals $P_{L1}$, $P_{L2}$ are generated by respective sources 72, 74. The logic signals $P_{L1}$, $P_{L2}$ should be of the same optical wavelength, and are sufficiently coherent to generate an interference pattern on the photoconductor 10 when they overlap in time and space. The logic signals $P_{L1}$, $P_{L2}$ should be equal in intensity to within a factor of three, and are preferably substantially equal in intensity. The photoconductor 10 can be identical to that described above in connection with FIG. 5.

As explained above, the voltage drop across the resistor 16 is proportional to the photocurrent, and in the switching device 70 this voltage is applied as an input to a photocurrent analyzer 76 (FIG. 12). The voltage is integrated in an integrator 78 for a selected time to generate an integrated value Q. Q is compared with a reference in a comparator 82, and the output signal $V_0$ is set in accordance with the result of the comparison. $V_0$ can be applied as an output signal to other logic circuits.

Q is equal to 0 when neither $P_{L1}$ nor $P_{L2}$ is present; Q is equal to $Q_1$ when either one or the other of $P_{L1}$ and $P_{L2}$ is present; and Q is equal to $Q_2$ when both $P_{L1}$ and $P_{L2}$ are present (FIG. 13). Because of the interference induced carrier modulation effects discussed above, $Q_2$ is much less than $Q_1$. $Q_R$ can be set between $Q_1$ and $Q_2$, and this value for $Q_R$ produces the shown in FIG. 13 for $V_0$: $V_0$ is in the logic high state VH when either one of $P_{L1}$, $P_{L2}$ is present, and $V_0$ is in the logic low state $V_L$ otherwise. The switching device 70 performs an EXCLUSIVE OR combination of $P_{L1}$ and $P_{L2}$, and in effect optically switches $P_{L1}$ depending on the presence or absence of $P_2$. In the switching device 70 the logic signals $P_{L1}$, $P_{L2}$ are amplitude switched. Alternately, optical frequency switching, spatial switching, or polarization switching can be used to modulate one or both of the logic signals $PL_1$, $P_{L2}$, keeping amplitude constant.

Of course, the photocurrent analyzer 76 can be replaced (1) with a high speed signal display device such as an oscilloscope for real time display, or (2) with a logic analyzer for digital work.

D. Optical Spectrum Analyzer

In the embodiments discussed above the two interfering optical signals are of the same optical wavelength. However, if one of the optical signals includes radiation at more than one optical wavelength, then the correlator of this invention can operate as a wavelength correlator, such as an optical spectrum analyzer or an optical demultiplexer.

FIGS. 14 through 17*c* relate to one embodiment of the wavelength correlator of this invention that functions as an optical spectrum analyzer As shown in FIG. 14, this optical spectrum analyzer is identical to the sampling device of FIG. 8 with respect to the photoconductor 10 and the photocurrent analyzer 56. However, the two optical sources 52', 54' of FIG. 14 differ from those of FIG. 8. In particular, the variable frequency optical source 52' generates an optical probe signal P' which has a continuously variable optical frequency $\nu$. In this example, the probe signal is a repeating sequence of pulses of selectable optical frequency $\nu$.

The optical sample signal source 54' generates a sample signal $P_S'$ which in this example is a repeating sequence of pulses, each having a broad band optical spectrum. The two signals $P_P'$, $P_S'$ overlap in time and space on the photoconductor 10. The probe signal $P_P'$ is sufficiently coherent to create a standing interference pattern with any component of the sample signal $P_S'$ having the same optical frequency $\nu$ as that of the probe signal $P_P'$.

Figure 15A:
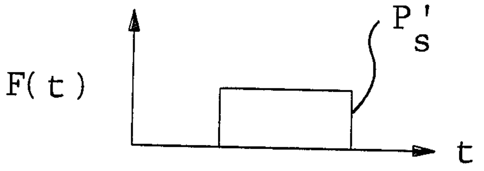
FIGS. 15a, 15b, 16a–16c, and 17a–17c are waveforms and graphs relating to various signals of the embodiment of FIG. 14.
Figure 15B:
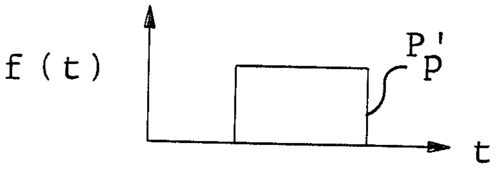

FIGS. 15*a* and 15*b* show the intensity of the signals $P_P'$, $P_S'$, respectively, as a function of time. In this example the two signals $P_P'$, $P_S'$ overlap in time completely.

Figure 16A:
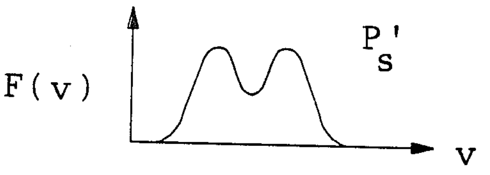
Figure 16B:
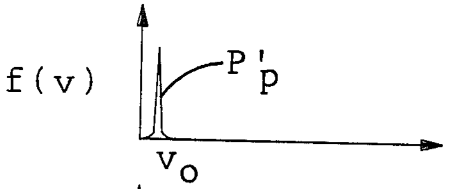

FIGS. 16*a* and 16*b* show the frequency distribution of the signals $P_S'$, $P_P'$, respectively. The sample signal $P_S'$ has a broad band, arbitrary distribution over a range of optical frequencies. In contrast, the probe signal $P_P'$ has a relatively narrow spectral distribution centered in FIG. 16*b* on frequency $\nu_0$.

Figure 16C:
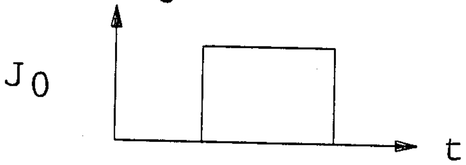

FIG. 16*c* shows the photocurrent $J_O$ produced by the photoconductor 10 when the two signals $P_P'$, $P_S'$ are both incident on the photoconductor 10 and the frequency of the probe signal $P_P'$ does not overlap the frequency of the sample signal $P_S'$. In this situation no standing interference patterns are created and the photocurrent during the signals is a constant value, equal to the sum of the photocurrents produced by the two signals $P_S'$, $P_P'$ individually.

Figure 17A:
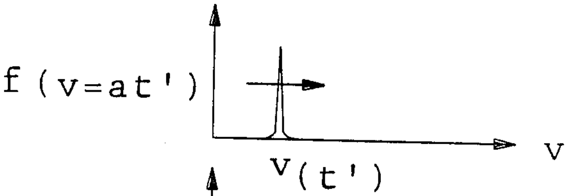
Figure 17B:
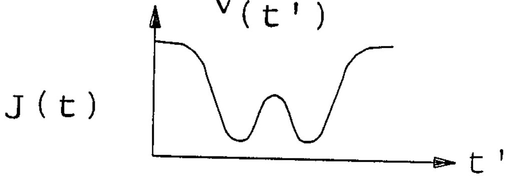
Figure 17C:
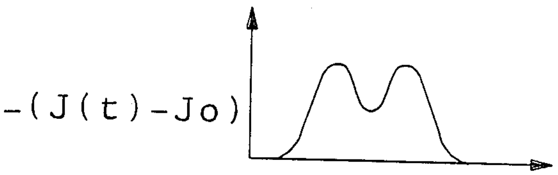

In order to obtain a spectrum analysis of the sample signal $P_S'$, the frequency of the probe signal $P_P'$ is changed over time, as shown in FIG. 17*a*. This causes the pulse signal $P_P'$ to scan the sample signal $P_S'$ in frequency domain. When the sample signal $P_S'$ has a frequency component at the frequency of the probe signal $P_P'$, the components of the two signals having the same optical frequency create a stationary interference pattern as described above. This stationary interference pattern causes carrier modulation which reduces the photocurrent generated by the photoconductor 10. The reduction in photocurrent is proportional to the amplitude of the spectral component of the sample signal $P_S'$ that corresponds to the frequency of the probe signal $P_P'$. FIG. 17*b* shows a graph of the photocurrent J(t') as a function of the frequency scan coordinate t' as the frequency $\nu(t')$ of the probe signal $P_P'$ is continuously increased. The graph of FIG. 17*b* was constructed in much the same way as that of FIG. 10*b* described above, except in this case the probe signal scans the sample signal in the frequency domain rather than in the time domain.

By inverting the photocurrent graph J(t') of FIG. 17*b* and subtracting a constant corresponding to JO, the waveform of FIG. 16*c* can be generated. This waveform provides a measure of the spectral distribution of energy in the sample signal $P_S'$.

Alternately the signals $P_S'$ and $P_P'$ can be continuously emitted signals rather than the pulse signals described above.

E. Optical Demultiplexer

Figure 18:
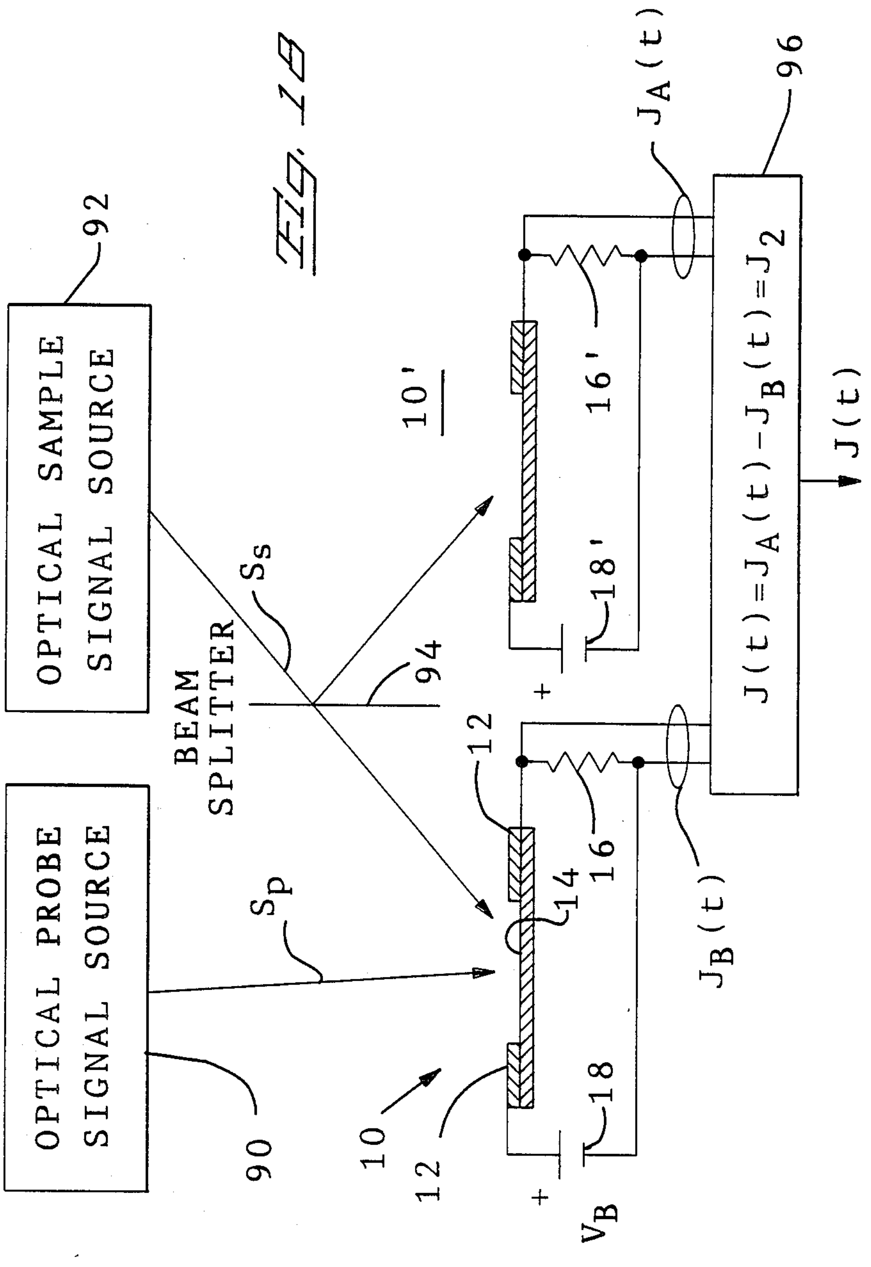
FIG. 18 is a block diagram of an optical demultiplexer

FIGS. 18 and 19*a*–19*f* relate to an optical demultiplexer which embodies the present invention and functions as a wavelength correlator. As shown in FIG. 18, this demultiplexer includes an optical probe signal source 90 and an optical sample signal source 92. The source 90 produces a sample signal $S_P$ which is incident on a photoconductor 10 identical to that described above. Similarly, the source 92 generates a sample signal $S_S$ which is incident on a beam splitter 94. The transmitted component of the sample signal $S_S$ is incident in the photoconductor 10, and the reflected portion of the sample signal $S_S$ is incident on a second photoconductor 10'. The photoconductor 10' may be a conventional photoconductor, or it may be identical to the photoconductor 10. The photoconductor 10 generates a photocurrent, and the signal $J_B(t)$ is proportional to this photocurrent. Similarly, the photocondutor 10' generates a photocurrent, which is proportional to the output signal $J_A(t)$.

As shown in FIG. 19*a*, the sample signal $S_S$ in this embodiment is a wavelength multiplexed logic signal made up of a series of pulses. Each of the pulses has a constant amplitude, and the pulses can be of any one of three optical frequencies $\nu_1$, $\nu_2$, $\nu_3$. Of course, a greater or lesser number of optical frequencies can be used in alternative embodiments.

As shown in FIG. 19*b* the probe signal $S_P$ in this embodiment is a constant amplitude signal of frequency $\nu_2$. FIG. 19*c* shows the output signal $J_B(t)$ when only the source 90 is operating and only the probe signal $S_P$ is incident on the photoconductor 10. Under these conditions the photocurrent generated by the photoconductor 10 is a constant amplitude signal having amplitude $J_2$.

FIG. 19 shows the output signal $J_A(t)$. It is assumed in this example that the photoconductors 10, 10' have identical spectral responses, and that the spectral response of the photoconductors 10, 10' is substantially identical at frequencies $\nu_1$, $\nu_2$, $\nu_3$. Under these circumstances $J_A(t)$ as shown in FIG. 19*d* corresponds closely to the sample signal $S_S$ as shown in FIG. 19*a*.

The output signal $J_B(t)$ when both the sample signal $S_S$ and probe signal $S_P$ are incident on the photoconductor 10 is shown in FIG. 19*e*. During pulses of the sample signal $S_S$ at frequencies $\nu_1$ or $\nu_3$ the output signal $J_B(t)$ is at a high value, corresponding to the sum of the photocurrents generated by each of the signals $S_P$, $S_S$ separately. This is because the probe signal $S_P$ is at the frequency $\nu_2$ while the sample signal $S_S$ is at either frequency $\nu_1$ or $\nu_3$. When the two signals are of differing optical frequencies no stationary interference patterns are created, and there is no reduction in the photocurrent resulting from carrier modulation as described above.

However, the photocurrent $J_B(t)$ is at a substantially lower level during the pulses in the sample signal $S_S$ at frequency $\nu_2$. For pulses at frequency $\nu_2$, the two signals $S_P$, $S_S$ are sufficiently coherent that optical interference between the probe signal $S_P$ and the sample signal $S_S$ substantially reduces or even eliminates the photocurrent generated by the photoconductor 10. The resulting waveform is shown in FIG. 19*e*. Preferably the amplitudes of the signal $S_P$ and the $\nu_2$ component of the signal $S_S$ are equal to one another at the photoconductor 10 to within a factor of three. Most preferably these two amplitudes are equal to one another.

Figure 19F:
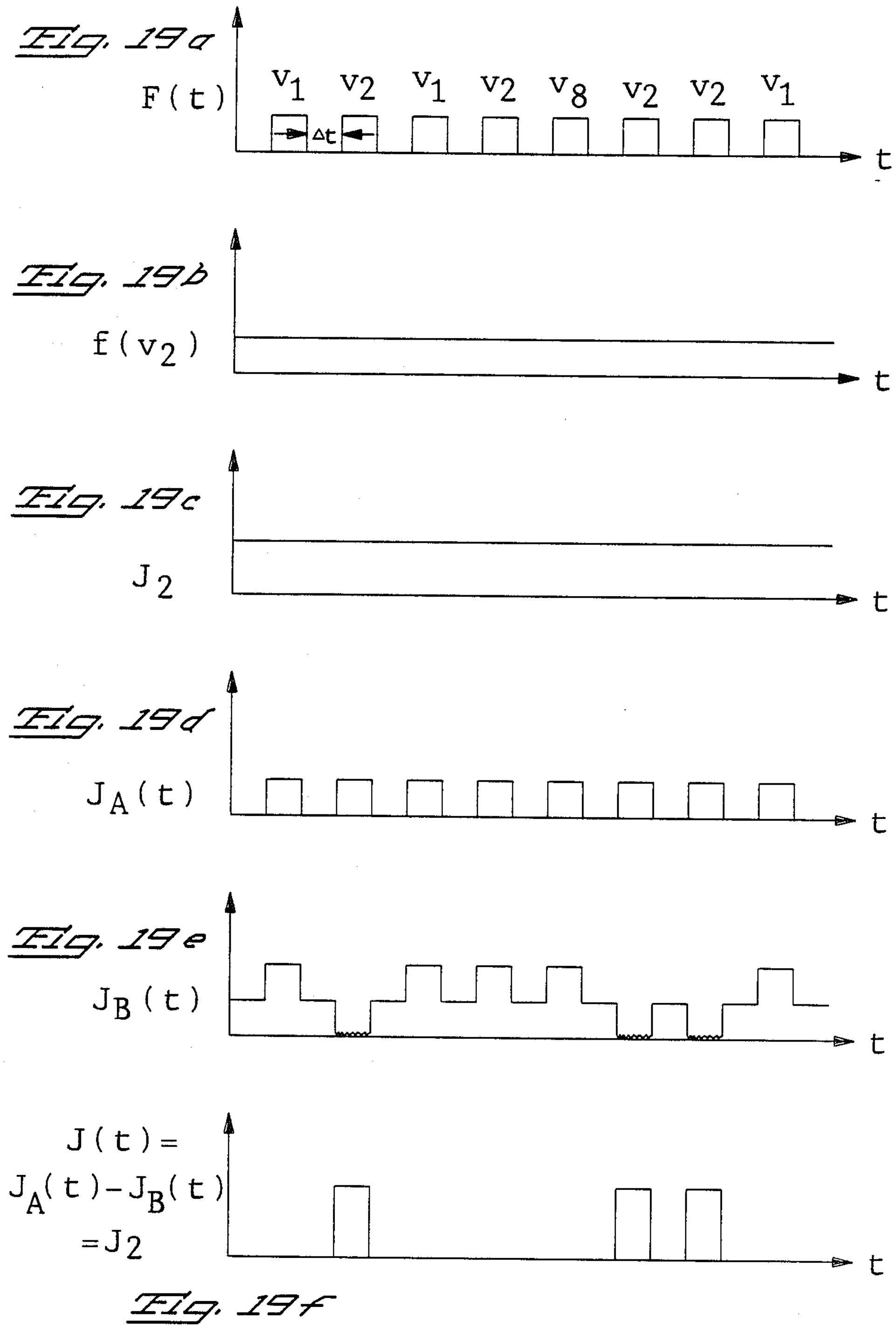

The demultiplexer of FIG. 18 includes a summer 96 that generates an output signal J(t) equal to $J_A(t)-J_B(t)+J_2$. As shown in FIG. 19*f*, J(t) includes a pulse only at times at which the sample signal $S_S$ includes a pulse of frequency $\nu_2$.

From this description it should be clear that the signals of $J_B(t)$, $J_A(t)$ can be used to detect only signals of a selected frequency out of all of these pulses generated by the signal source 92. By simply adjusting the wavelength of the probe signal $S_P$ to correspond to the desired set of pulses in the sample signal $S_S$, the desired set of pulses can be demultiplexed for subsequent processing.

The demultiplexer described above can be simplified by eliminating the photoconductor 10', the beam splitter 94, and the summer 96, as long as the spectral distribution of the probe signal $S_P$ is chosen properly. For example, if the probe signal has frequency components at both $\nu_1$ and $\nu_2$, the photocurrent $J_B(t)$ will selectively indicate only pulses of frequency $\nu_3$ in the sample signal $S_S$, and background signals during intervals $\Delta t$; $\Delta t$ can be set to zero.

In the demultiplexer described above the signal $S_S$ is amplitude modulated. Alternately, optical frequency modulation, spatial modulation, or polarization modulation can be substituted for or combined with amplitude modulation.

F. Alternative Embodiments

This invention is, of course, not limited to the embodiments described above. Characteristics of the photosensor can be modified within a broad range while still achieving the desired reduction in the sensor signal when the interference pattern is generated. Materials, carrier lifetimes, and carrier diffusion rates can all be optimized for the particular application at hand. Furthermore, photovoltaic sensors may well be adapted to detect the presence of an interference pattern through interference induced carrier modulation.

This invention is not restricted to use with signals of any one region of the electromagnetic spectrum, and the terms "optical", "photo" and "light" are not intended to be restricted to visible light. In addition, interfering beams other than optical beams may be used with suitable detectors.

Also, it is not essential in all embodiments that the beams be incident on the sensor from one side of the sensor as shown in FIG. 1*a*. With suitable sensors the beams may interfere inside the sensor. The angle $\theta$ can then have a full range, and the beams can be antiparallel. In high index of refraction material, practical nodal spacing can be as small as a thousand angstroms.

Of course, this invention is not restricted to use with plane polarized beams, or to interference patterns with rectilinear nodes. More complex interference patterns may be used, as long as they modify the effective resistance seen by the charge carriers in the sensor.

In the embodiment discussed above a photocurrent signal is integrated to measure Q in order to detect the presence or absence of the interference pattern. Alternately, other parameters can be measured. For example, the photocurrent can be displayed in real time on an oscilloscope and photocurrent amplitude can be measured to achieve a similar result.

It is therefore intended that the foregoing description be regarded as illustrative rather than limiting. It is the following claims, including all equivalents, that are intended to define the scope of this invention.

We claim:

1. A correlator based on interference induced carrier modulation, said correlator comprising:

a sensor system comprising a sensor element operative to supply charge carriers when excited by an energy beam and means for generating a sensor signal in response to said charge carriers;

means for directing first and second beam signals at the sensor element to form an interference pattern thereon when the beam signals overlap in time and space on the sensor element, said interference pattern producing a spatial modulation in the distribution of said carriers, said first and second beam signals comprising respective interfering components which overlap in time, beam frequency and space at the sensor, and where the two interfering components have intensities that are within a factor of three of being identical; and means for monitoring the sensor signal to detect a parameter of the sensor signal which varies as a function of the presence of the interference pattern.

2. The invention of claim 1 wherein the intensities of the two interfering components are identical to within a factor of 1.5.

3. The invention of claim 1 wherein the intensities of the two interfering components are substantially equal to one another.

4. The invention of claim 1 wherein said interference pattern defines a characteristic nodal spacing, wherein said carriers include higher mobility carriers and lower mobility carriers, and wherein said carriers have an ambipolar diffusion length less than the characteristic nodal spacing.

5. The invention of claim 4 wherein said higher mobility carriers have a mobility greater than $10cm^2$/volt-sec.

6. The invention of claim 1 wherein the first and second beam signals have substantially the same beam frequency distribution.

7. The invention of claim 1 wherein the directing means comprises source means for generating a beam; beam splitter means for splitting the beam into first and second partial beams; delay means for delaying the first partial beam by a variable amount to form the first beam signal; and wherein the second partial beam is supplied to the sensor element as the second beam signal.

8. The invention of claim 1 wherein the directing means comprises means for generating a longer duration sample signal as the first beam signal, means for generating a shorter duration probe signal, and delay means for delaying the probe signal by a variable amount to form the second beam signal, thereby allowing the second beam signal to be synchronized in time with selected portions of the first beam signal.

9. The invention of claim 1 wherein the first and second beam signals comprise logic signals, and wherein the monitoring means comprises means for indicating a logical combination of the first and second beam signals.

10. The invention of claim 9 wherein the logical combination is EXCLUSIVE OR.

11. The invention of claim 1 wherein the first and second beam signals comprise first and second logic signals, respectively, and wherein the detected parameter is indicative of the first logic signal switched in response to the second logic signal.

12. The invention of claim 1 wherein the detected parameter is indicative of an integration of the sensor signal, and wherein the monitoring means comprises means for integrating the sensor signal to form an integrated value.

13. The invention of claim 1 wherein the sensor system comprises a pair of electrodes on opposed sides of the sensor element, wherein the electrodes define an electrical field axis extending therebetween, wherein the interference pattern causes the spatial modulation of the carriers to be arranged in planes, and wherein at least some of the planes intersect the field axis at an angle greater than zero.

14. The invention of claim 13 wherein the angle is substantially equal to 90°.

15. The invention of claim 1 wherein the spatial modulation in the distribution of said carriers reduces the sensor signal such that an integrated value of the sensor signal is less when the first and second signals interfere to form the interference pattern than when the first and second signals do not interfere.

16. The invention of claim 1 wherein the correlator is a frequency domain correlator, wherein the second beam signal comprises first frequency components which substantially coincide in beam frequency with the first beam signal and second frequency components which do not overlap in beam frequency with the first beam signal, and wherein the interference pattern results only from interference between the first beam signal and the first frequency components of the second beam signal.

17. The invention of claim 16 wherein the first beam signal comprises a probe signal at beam frequency $\nu_1$, wherein the second beam signal comprises a logic signal comprising first pulses at beam frequency $\nu_1$ and second pulses at beam frequency $\nu_2$, and wherein the first pulses are included in the first frequency components and the second pulses are included in the second frequency components.

18. The invention of claim 16 wherein the first beam signal has a frequency distribution narrower than the frequency distribution of the second beam signal, and wherein the directing means comprises means for adjusting the frequency distribution of the first beam signal to overlap with varying selected portions of the frequency distribution of the second beam signal.

19. The invention of claim 1 wherein the sensor comprises a photosensor, wherein the beam signals comprise respective optical signals, and wherein the beam frequencies correspond to optical frequencies.

20. The invention of claim 19 wherein the sensor element comprises a photoconductor.

21. The invention of claim 20 wherein the photoconductor comprises at least two electrodes and a crystalline semiconductor interposed between the electrodes.

22. A subpicosecond solid state optical correlator based on interference induced carrier modulation, said correlator comprising:

a photosensor circuit comprising a semiconductor photoconductive element, a pair of opposed electrodes, each on a respective side of the element, and means for generating a voltage difference across the electrodes to define an electrical field direction; said element operating to generate charge carriers in response to optical energy incident on the photoconductive element, said charge carriers interacting with the voltage difference to create a photocurrent between the electrodes;

means for directing first and second optical signals to photoconductive element, said first and second optical signals comprising respective interfering components which overlap in time, optical frequency and space at the photoconductive element, and where the two interfering components have intensities that are within a factor of three of being identical to form an interference pattern thereon, at least one of said interfering components being modulated, thereby time modulating said interference pattern, said interference pattern producing spatial modulation of the distribution of said carriers into planes, at least some of which are not parallel to the electrical field direction; and means for monitoring the photocurrent to detect a parameter associated with the time modulation of the interference pattern;

said interference pattern a characteristic nodal spacing between adjacent ones of the lines, said carriers including higher mobility carriers and lower mobility carriers, and said carriers having a characteristic ambipolar diffusion length no greater than the characteristic nodal spacing such that an integrated value of the photocurrent is less when the interfering components form the interference pattern than when the interfering components do not.

23. The invention of claim 22 wherein the intensities of the two interfering components are identical to within a factor of 1.5.

24. The invention of claim 22 wherein the intensities of the two interfering components are substantially equal to one another.

25. The invention of claim 22 wherein the first and second optical signals have substantially the same optical frequency distribution.

26. The invention of claim 22 wherein the directing means comprises optical source means for generating an optical beam; beam splitter means for splitting the optical beam into first and second partial beams; delay means for delaying the first partial beam by a variable amount to form the first optical signal; and wherein the second partial beam is supplied to the photoconductive element as the second optical signal.

27. The invention of claim 22 wherein the directing means comprises means for generating a longer duration sample signal as the first optical signal; means for generating a lower duration probe signal; and delay means for delaying the probe signal by a variable amount to form the second optical signal, thereby allowing the second optical signal to be synchronized in time with selected portions of the first optical signal.

28. The invention of claim 22 wherein the first and second optical signals comprise logic signals, and wherein the monitoring means comprises means for indicating a logical combination of the first and second optical signals.

29. The invention of claim 28 wherein the logical combination is EXCLUSIVE OR.

30. The invention of claim 22 wherein the first and second optical signals comprise first and second logic signals respectively, and wherein the detected parameter is indicative of the first logic signal switched in response to the second logic signal.

31. The invention of claim 22 wherein the detected parameter is indicative of an integration of the photocurrent, and wherein the monitoring means comprises means for integrating the photocurrent to form an integrated value.

32. The invention of claim 22 wherein said higher mobility carriers have a mobility greater than $10cm^2/volt\text{-}sec$.

33. The invention of claim 22 wherein at least some of the lines intersect the electrical field direction at an angle of about 90°.

34. The invention of claim 22 wherein the correlator is a frequency domain correlator, wherein the second optical signal comprises first frequency components which substantially coincide in optical frequency with the first optical signal and second frequency components which do not overlap in optical frequency with the first optical signal, and wherein the interference pattern results only from optical interference between the first optical signal and the first frequency components of the second optical signal.

35. The invention of claim 34 wherein the first optical signal comprises a probe signal at optical frequency $\nu_1$, wherein the second optical signal comprises a logic signal comprising first pulses at optical frequency $\nu_1$ and second pulses at optical frequency $\nu_2$, and wherein the first pulses are included in the first frequency components and the second pulses are included in the second frequency components.

36. The invention of claim 34 wherein the first optical signal has an optical frequency distribution narrower than the optical frequency distribution of the second optical signal, and wherein the directing means comprises means for adjusting the frequency distribution of the first optical signal to overlap with varying selected portions of the frequency distribution of the second optical signal.

37. The invention of claim 22 wherein the photoconductive element comprises a crystalline semiconductor.

38. An optical demultiplexer for a multiplexed optical signal comprising components at optical frequencies $\nu_1$ and $\nu_2$, said demultiplexer comprising:

a photosensor having a photosensitive element operative to supply charge carriers in response to optical energy incident on the photosensitive element, and means for generating a sensor signal in response to said charge carriers, said photosensitive element positioned such that the multiplexed optical signal falls on the photosensitive element;

means for directing a probe optical signal to the photosensitive element, said probe optical signal having an optical frequency distribution that overlaps with a first one of the components but not with the other of the components such that the probe signal forms an optical interference pattern with said first one of the components on the photosensitive element when the probe signal and the first one of the components overlap in time and space, said interference pattern producing a spatial modulation in the distribution of said carriers; and means for monitoring the sensor signal to detect a parameter of the sensor signal which varies as a function of the presence of the interference pattern, thereby demultiplexing the first and second components.

39. The invention of claim 38 wherein said interference pattern defines a characteristic nodal spacing, wherein said carriers include higher mobility carriers and lower mobility carriers, and wherein said carriers have an ambipolar diffusion length less than the characteristic nodal spacing.

40. The invention of claim 39 wherein the higher mobility carriers have a mobility greater than 10 $cm^2$/volt-sec.

41. The invention of claim 38 wherein the photosensitive element comprises a pair of electrodes on opposed sides of the photosensitive element, wherein the electrodes define an electrical field axis extending therebetween, wherein the interference pattern causes the spatial modulation of the carriers to be arranged in planes, and wherein at least some of the planes intersect the field axis at an angle greater than zero.

42. The invention of claim 41 wherein the angle is substantially equal to 90°.

43. The invention of claim 38 wherein the photosensitive element comprises a crystalline semiconductor.

44. An optical correlator comprising:

a photo sensor having a photosensitive element operative to supply charge carriers in response to optical energy incident on the photosensitive element, and means for generating a sensor signal in response to said charge carriers;

means for directing first and second optical signals to the photosensitive element to form an interference pattern thereon when the first and second optical signals overlap in time and space, said interference pattern producing a spatial modulation in the distribution of said carriers;

means for monitoring the sensor signal to detect a parameter of the sensor signal which varies as a function of the presence of the time modulated interference pattern; and delay means for delaying said second optical signal by a variable amount prior to incidence of the second optical signal on the photosensitive element, thereby allowing the second optical signal to be adjusted in phase with respect to the first optical signal.

45. The invention of claim 44 wherein said interference pattern defines a characteristic nodal spacing, wherein said carriers include higher mobility carriers and lower mobility carriers, and wherein said carriers have an ambipolar diffusion length less than the characteristic nodal spacing.

46. The invention of claim 45 wherein the higher mobility carriers have a mobility greater than 10$cm^2$/volt-sec.

47. The invention of claim 44 wherenn the first and second optical signals have substantially the same optical frequency distribution.

48. The invention of claim 44 wherein the directing means comprises optical source means for generating an optical beam, and beam splitter means for splitting the optical beam into the first and second optical signals.

49. The invention of claim 44 wherein the directing means comprises means for generating a longer duration sample signal as the first optical signal; and means for generating a lower duration probe signal as the second optical signal, such that the delay means delays the probe signal by a variable amount to allow the second optical signal to be synchronized in time with selected portions of the first optical signal.

50. The invention of claim 44 wherein the detected parameter is indicative of an integration of the sensor signal, and wherein the monitoring means comprises means for integrating the sensor signal to form an integrated value.

51. The invention of claim 44 wherein the sensor signal is indicative of a photocurrent passed by the photosensitive element in response to optical energy incident on the photosensitive element.

52. The invention of claim 44 wherein the photosensitive element comprises a pair of electrodes on opposed sides of the photosensitive element, wherein the electrodes define an electrical field axis extending therebetween, wherein the interference pattern causes the spatial modulation of the carriers to be arranged in planes, and wherein at least some of the planes intersect the field axis at an angle greater than zero.

53. The invention of claim 52 wherein the angle is substantially equal to 90°.

54. The invention of claim 44 wherein the spatial modulation in the distribution of said carriers reduces the sensor signal such that an integrated value of the sensor signal is less when the first and second signals interfere to form the interference pattern than when the first and second signals do not interfere.

55. The invention of claim 44 wherein the photosensitive element comprises a crystalline semiconductor.

* * * * *

UNITED STATES PATENT OFFICE
CERTIFICATE OF CORRECTION

Patent No. 4,866,660 Dated September 12, 1989

Inventor(s) Henri Merkelo, Bradley McCredie and Mark Veatch

It is certified that error appears in the above-identified patent and that said Letters Patent is hereby corrected as shown below:

In claim 22, column 19, line 20, before "photoconductor" add --the--.

In claim 22, column 19, line 36, after "pattern" add --defining--.

Signed and Sealed this

Thirtieth Day of October, 1990

*Attest:*

HARRY F. MANBECK, JR.

*Attesting Officer*

*Commissioner of Patents and Trademarks*